April 29, 1958 M. JUHAS 2,832,662
SHIFT MECHANISM FOR TIME RECORDER
Filed Sept. 28, 1954 5 Sheets-Sheet 1

INVENTOR.
Michael Juhas
BY
Att'y

April 29, 1958 M. JUHAS 2,832,662
SHIFT MECHANISM FOR TIME RECORDER
Filed Sept. 28, 1954 5 Sheets-Sheet 3

INVENTOR.
Michael Juhas
BY
Atty

April 29, 1958 M. JUHAS 2,832,662
SHIFT MECHANISM FOR TIME RECORDER
Filed Sept. 28, 1954 5 Sheets-Sheet 4

INVENTOR.
Michael Juhas
BY
Att'y

April 29, 1958 — M. JUHAS — 2,832,662
SHIFT MECHANISM FOR TIME RECORDER
Filed Sept. 28, 1954 — 5 Sheets-Sheet 5
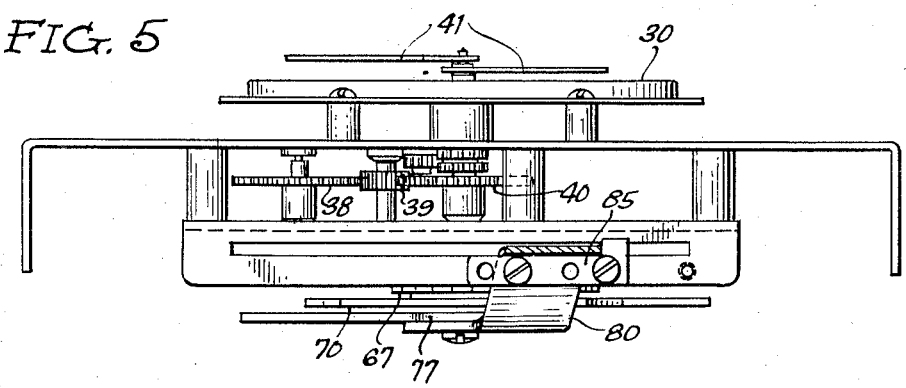
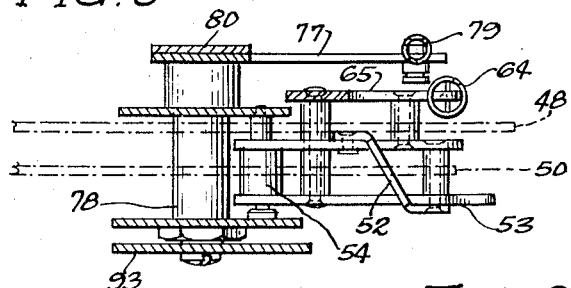
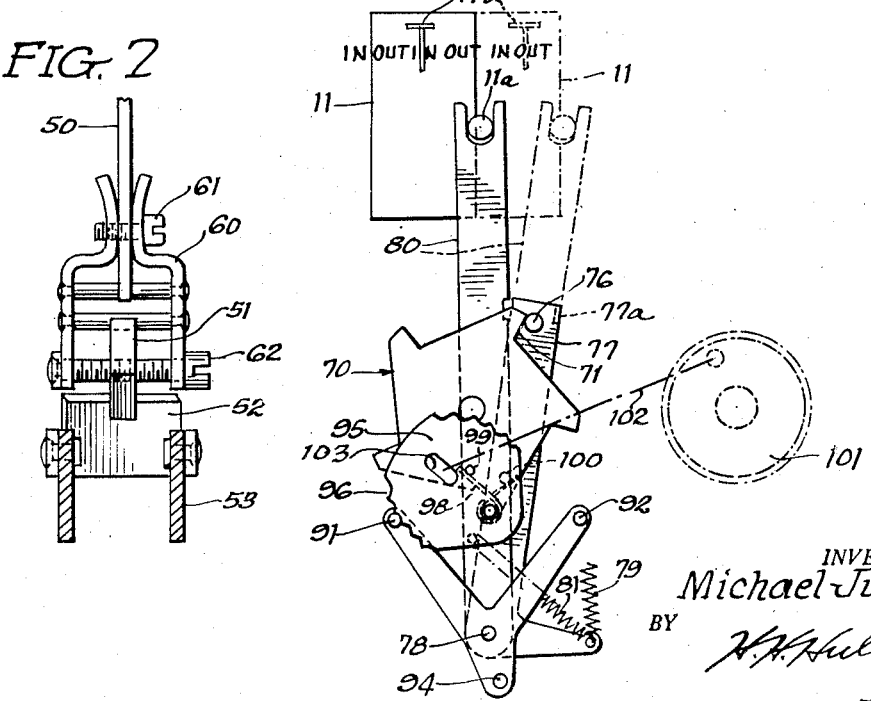
INVENTOR.
Michael Juhas
BY
Att'y

United States Patent Office 2,832,662
Patented Apr. 29, 1958

2,832,662

SHIFT MECHANISM FOR TIME RECORDER

Michael Juhas, Torrington, Conn., assignor to General Time Corporation, New York, N. Y., a corporation of Delaware Application September 28, 1954, Serial No. 458,820

6 Claims. (Cl. 346—86)

The present invention relates to workmen's in-and-out time recorders and in particular to a mechanism for automatic shifting between adjacent columns on a time card.

It is an object of the present invention to provide a novel shift mechanism for a time recorder which produces positive relative positioning of the type unit with respect to the columns on the card. It is another object to provide a shift mechanism which is simpler and less expensive than prior devices employed for this purpose and which does not require an auxiliary centering or detent mechanism to provide accurate columnar alinement. It is a further object to provide a shift unit for a time recorder which may be used universally with cards having different numbers of total columns with only minor modification or adjustment. It is still another object to provide a shift mechanism having novel provision for manual overpowering when it is desired to print in a column other than that for which the recorder is automatically set.

Other objects and advantages of the invention will become apparent upon reference to the attached detailed description and the accompanying drawings in which:

Fig. 5 is a top view showing a portion of the mechanism and taken along the line 5—5 in Fig. 3.

Fig. 6 is a fragmentary section, taken along the line 6—6 in Fig. 1.

Fig. 7 is a fragment showing one of the operating cams and cam follower.

Fig. 8 is a diagram showing the effect of manual overpowering.

While the invention has been described herein in connection with the preferred embodiment of the invention, it will be understood that I do not intend to limit myself to such embodiment but intend to cover all modifications and alternative constructions included within the spirit and scope of the appended claims.

Workmen's in-and-out time recorders, which are used for recording time on the job, conventionally include a shifting mechanism for shifting a printing unit from column to column on a time card, together with a lift unit for determining the line on which the printing takes place. In the particular recorder to be discussed below it will be assumed that the in-and-out times are imprinted in the vertical column with the days of the week represented by successive lines on the card. In a typical case the recorder may be arranged to shift automatically to the first "in" column at 7:55 a. m. and to the first "out" column at 11:55 a. m. to take care of the morning work session. The device may be further arranged to shift to the next "in" column at 12:55 p. m. and to the next "out" column at 4:55 p. m. Additional columns are provided for recording overtime work. It will nevertheless be understood that the device to be described is not limited to shifting between "in" and "out" columns but may also be employed to shift between columns representing the days in the week. For a more complete discussion of a workmen's time recorder and the manner in which it is used, reference may be made to Lorenz co-pending application, Serial No. 349,419, filed April 17, 1953, now Patent No. 2,773,733, issued December 11, 1956.

Figure 1:
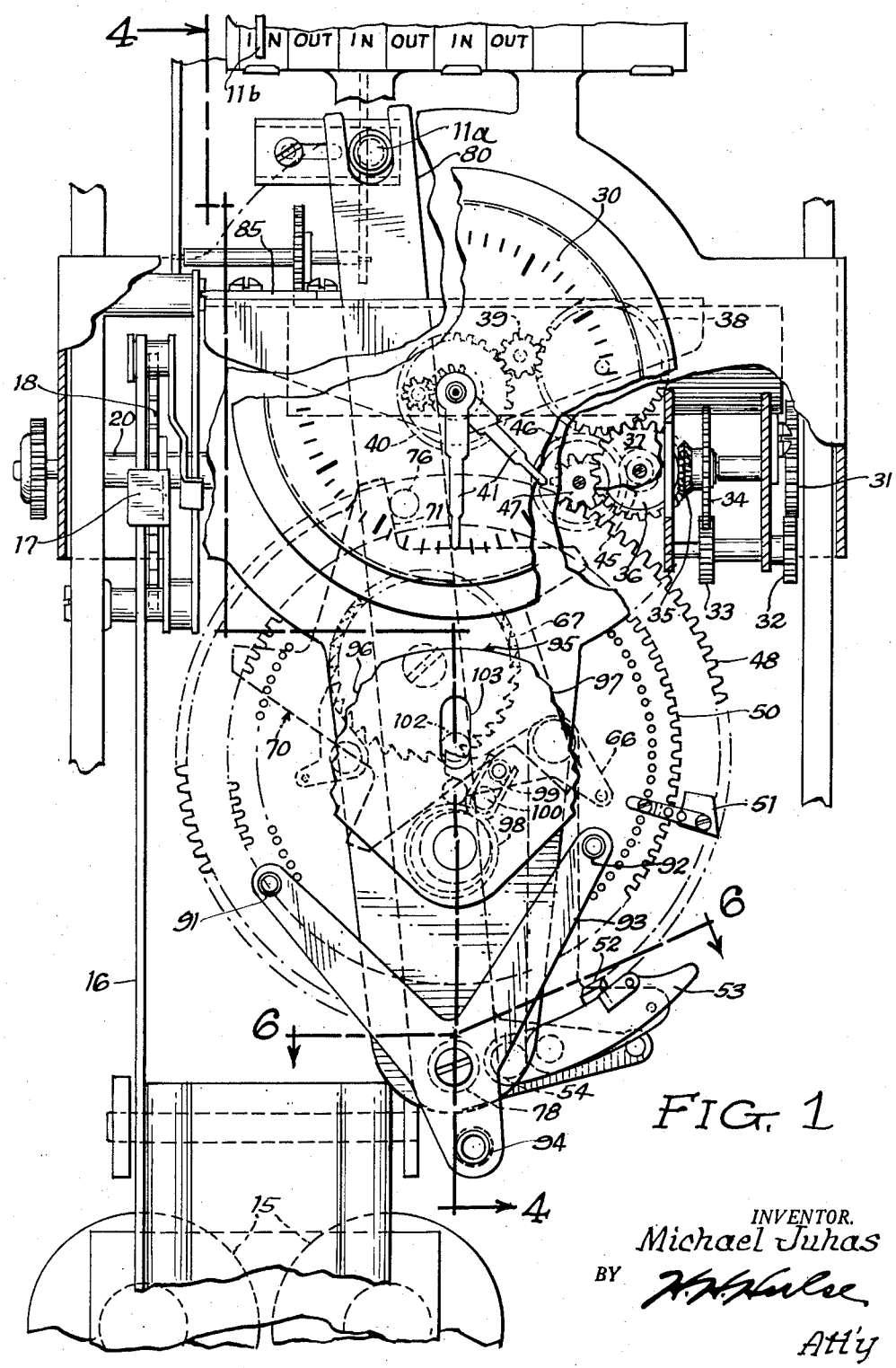
Figure 1 is the front or elevation view of the shift mechanism embodying the present invention with the case removed and with certain portions broken away to reveal the detailed structure.
Figure 2:
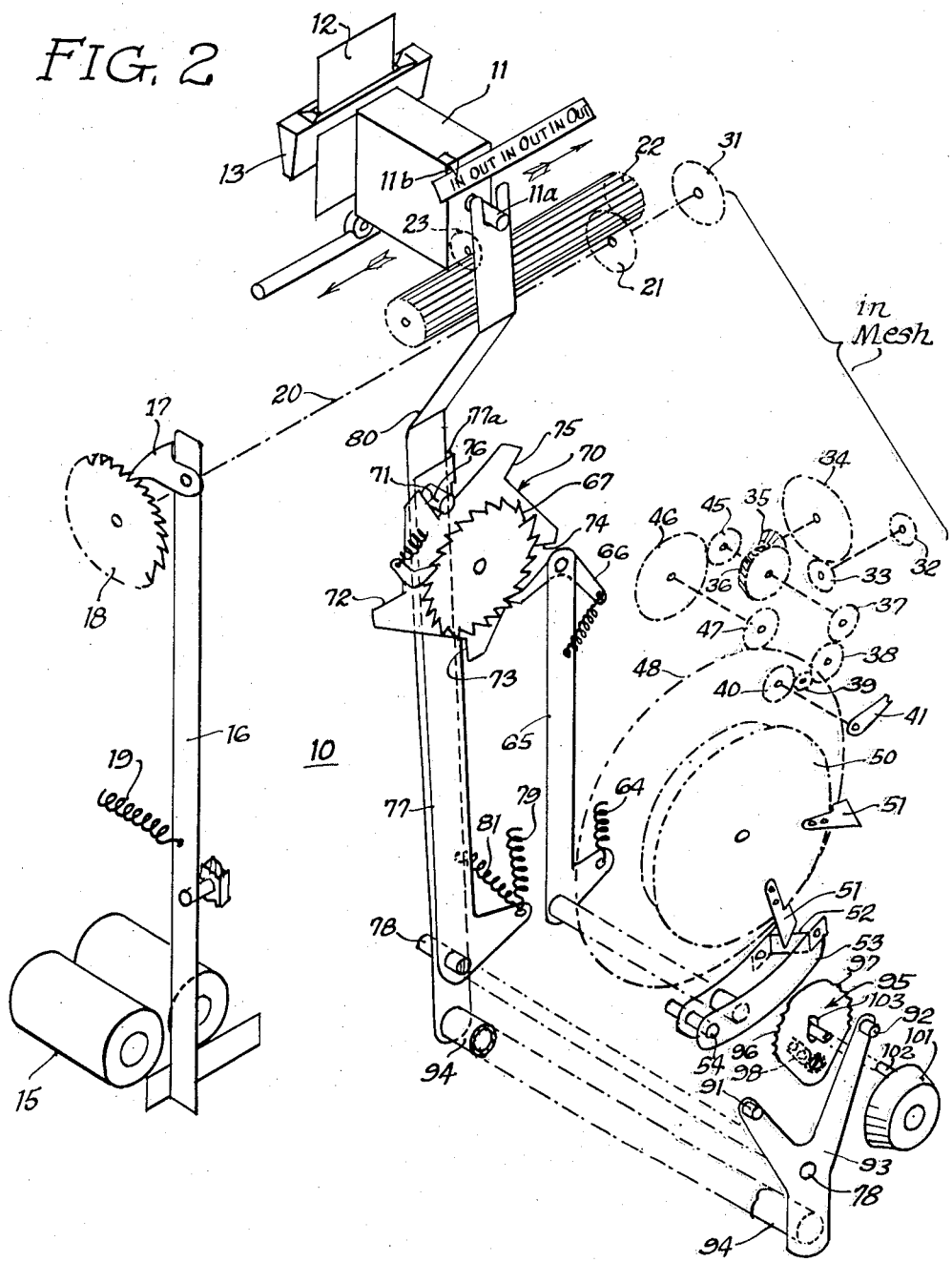
Fig. 2 is a diagrammatic perspective of certain portions of the mechanism shown in Fig. 1.
Figure 3:
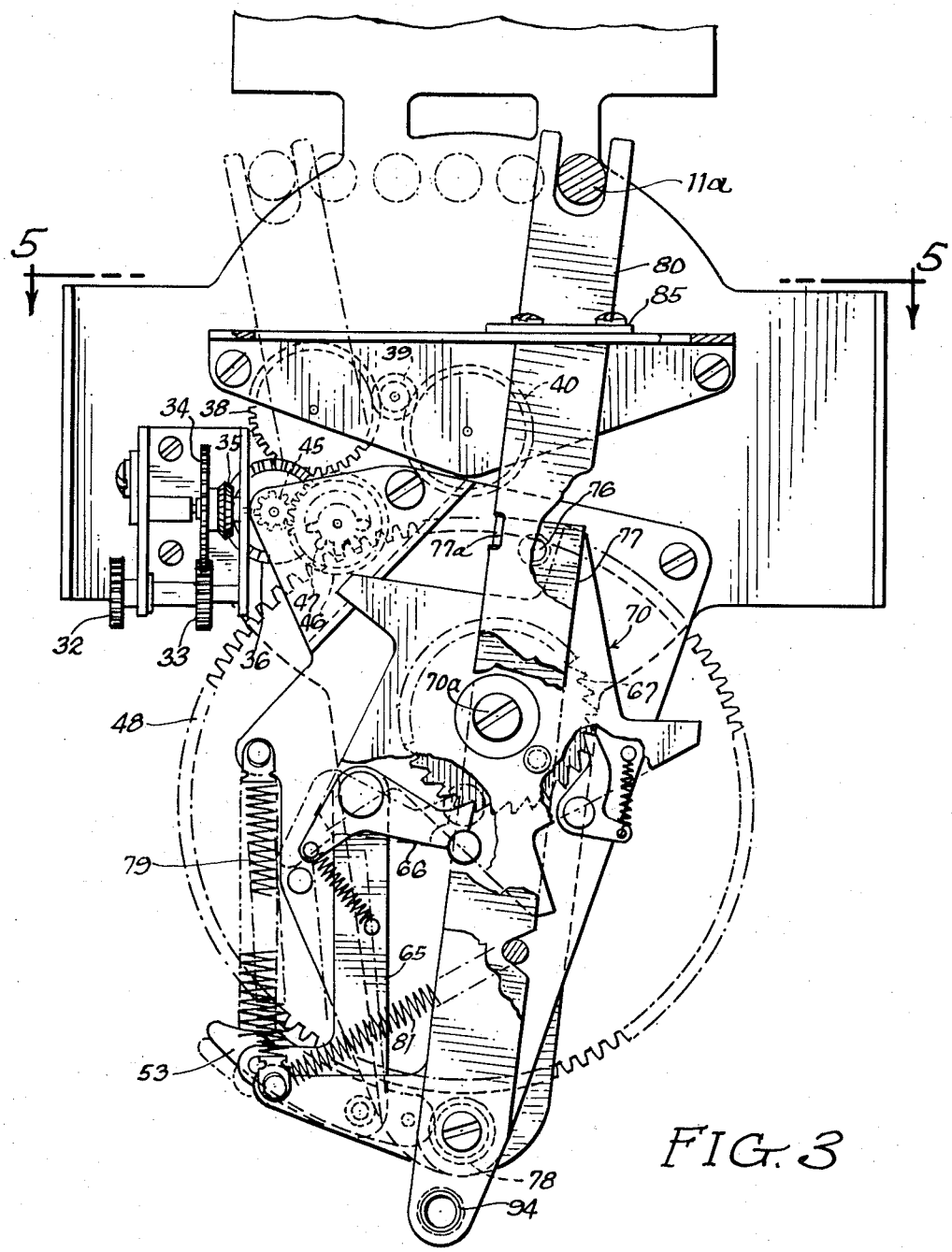
Fig. 3 is a back view of the mechanism shown in Fig. 1 with certain portions broken away.

In order to understand the structures and operation of the present shift mechanism, primary attention may be given to Figs. 1 and 3 and to the simplified diagram in Fig. 2. The mechanism, indicated generally at 10, is used in the present instance to position a type unit 11 which is laterally slidable within the recorder relative to a time card 12 inserted in the funnel 13. The position occupied by the type unit is indicated by a pointer 11b. Prior to discussing the shift mechanism, it will be helpful to review the driving train used for driving the type disks in the unit 11.

In a conventional recorder system an impulse is sent out over a control line once each minute from a central control station. Referring to Fig. 2, the impulse is received by a solenoid or magnet 15 which actuates a lever 16 carrying a pawl 17. This causes the pawl to "take a tooth" on a ratchet wheel 18 and tensions a return spring 19. When the solenoid is de-energized, the lever 16 is free to return under the influence of the return spring, causing the pawl to advance the ratchet wheel 18 forwardly an amount equal to the angle occupied by a single tooth. The rotary movement is transferred by a shaft 20 to a gear 21 which engages a long pinion 22. Such long pinion drives a gear 23 in the type unit 11 in all of its printing positions. Included within the type unit 11 are a set of type wheels (not shown) which, via the gear train referred to, are driven synchronously with the master clock. The time is also visually indicated on a clock face 30. For driving the clock hands, and for the purpose of driving a program gear to which reference will later be made, a gear train is provided which includes gears 31, 32 and 33, 34, as well as beveled gears 35, 36. Coupled to the beveled gear 36 is a train of gears 37, 38, 39 and 40 connected to the minute hand 41.

Also coupled to the second beveled gear 36 are gears 45, 46, 47, the latter meshing with a program gear 48. The overall gear ratio is such that the program gear 48 rotates once every twenty-four hours.

Arranged adjacent to the program gear and rigidly connected thereto is a cam disk 50 mounting a series of cams 51. Provision is made on the cam disk 50 for a total of 48 possible cam positions, one for each half-hour during the twenty-four hour day. Positioned in the path of movement of the cams 51 is a cam follower 52, mounted on a cam follower arm 53 which is pivoted at a pivot 54. As will be apparent to one skilled in the art, a cam 51 is provided for each actuation of the shift mechanism desired during a given twenty-four hour period. In the present instance it will be assumed that the total of six shifting movements are desired during the twenty-four hour period to position the printing unit 11 in the six column positions. However, for the sake of simplicity only two of the cams 51 are shown in Figs. 1 and 2.

Following conventional practice, means are provided for adjusting the particular minute during a given half-hour interval at which actuation of the cam follower arm, and hence actuation of the shift mechanism, shall take place. This is accomplished, as shown in Figs. 2 and 6, by angling the cam follower 52 and by providing for lateral adjustment of each of the cams 51. Referring to Fig. 7, the cam 51 is mounted in a cam carrier 60, which is fastened to the periphery of the cam disk 50 by means of a screw 61. The cam carrier 60 includes spaced arms which are spanned by a threaded mounting screw 62 which threadedly engages and supports the cam 51. It will be apparent that by appropriate turning of the adjusting screw 62 the instant of drop-off, and hence the instant of shifting, may be determined with a fine degree of precision. As a result of the accuracy afforded by the illustrated construction, units of this type are conventionally referred to as "mirco units." In the discussion which follows, it will be assumed that the various cams 51 are appropriately spaced and adjusted to provide shifting steps at the desired times throughout the course of the day, as discussed in the introduction.

Bodily carried by the cam follower 53 is a ratchet arm 65 having a return spring 64 and carrying a spring biased pawl 66 at its upper end. The pawl 66 engages a ratchet wheel 67 which is coupled directly to a star wheel 70 having a total of five arms defining radial abutments 71—75.

Arranged in the path of movement of the abutments for positioning thereby is a stop pin 76 mounted on an arm 77, which extends vertically within the recorder and which is pivoted about a pivot 78. As shown in the drawings the stop pin 76 is biased against the abutting surface 71 by means of biasing spring 79. It will be apparent that the arm 77 assumes a position determined by the position or phasing of the star wheel. Arranged adjacent to the arm 77 is a shift arm 80 which is pivoted on the pivot 78 at its lower end and which is bifurcated at its upper end for receiving a projection 11a on the type unit 11.

Under normal conditions the shift arm 80 and its associated arm 77 move together as a unit so that the stop pin 76 may, for purposes of analysis, be considered as mounted on the arm 80. The two arms are coupled together by a shoulder 77a on the arm 77 which engages the edge of the shift arm 80 as shown, the shoulder 77a being bottomed against the shift arm by means of a coil spring 81 connected between the arms. The coupling between the arms forms a "breakaway" connection, enabling the regular shift mecahnism to be manually overpowered for movement of the type unit to the left when desired, as will be discussed more fully in the paragraphs which follow.

With regard to the operation of the device thus far described, it will be apparent that successive impulses received by the solenoid 15 acting through the gear train causes gradual timed advancement of the program gear 48. As the result of the interference between the active cam 51 and the cam follower 52, the pawl arm 65 is gradually retracted against the restoring force of the spring 64. When the point of drop-off is reached, for example, at 11:55 a. m., the pawl arm 65 is released and is advanced through the distance of one tooth by energy stored in the spring 64. This causes the star wheel 70 to be rotated through one step of movement, advancing the stop pin 76 to the right and causing corresponding advancement of the shift arm 80 and the printing unit 11 connected thereto. The printing unit 11 is thus moved from one column to the adjacent column. It is to be noted that the radial abutment 71 on the star wheel 70 provides positive positioning of the shift arm, thereby enabling a higher degree of accuracy than is possible when using conventional cam positioning arrangements and insuring a neater, more precise appearing time card with printed entries which are perfectly alined.

After the shift arm has been successively advanced through its six "in-out" positions during the course of the day, the sixth actuation causes the stop pin 76 to ride clear of the abutment 71, causing the shift arm to swing to the left under the urging of the spring 79. This action is due to the fact that the arms of the star are substantially shorter than the radius arm of the stop pin 76. The stop pin then seats in the abutment 72, restoring the printing unit to its extreme left-hand position in readiness for printing in the first column. It will be apparent to one skilled in the art that the amplitude of swing of the shift arm depends upon the number of arms of the star wheel. For use with a six-column card, it is convenient to use a star wheel having five arms. The associated ratchet wheel 67 should have a number of teeth per arm equal to the number of columns on the card, six in the present instance.

It is one of the features of the present construction that the shift arm 80 is not limited to a total of six positions, i. e., six columns. The range may be extended, if desired, to eight columns simply by using a star wheel having four arms instead of five and by using a ratchet wheel having eight teeth per arm. For this purpose, the star wheel and ratchet are made integral with one another and are replaced as a unit simply by unscrewing a central pivot screw 70a (Fig. 3). Where it is desired to have four columns, rather than the six provided for in the present device, this may be accomplished by using two additional cams 51 on the program disk to provide idle advancing movements of the shift arm 80 in succession, for example, just prior to the beginning of a working day. This effectively omits columns at the right-hand side of the card. Two left-hand columns may similarly be omitted by providing idle actuations together with a stop 85 (Fig. 3) which limits the leftward movement of the printing unit 11. Substituting a replacement star wheel or providing for the idle actuations with or without the stop 85, is something which can be accomplished within a very few minutes so that the present shift mechanism may be considered perfectly flexible in operation and capable of use with cards having any reasonable number of columns.

*Manual overpowering mechanism*

Figure 4:
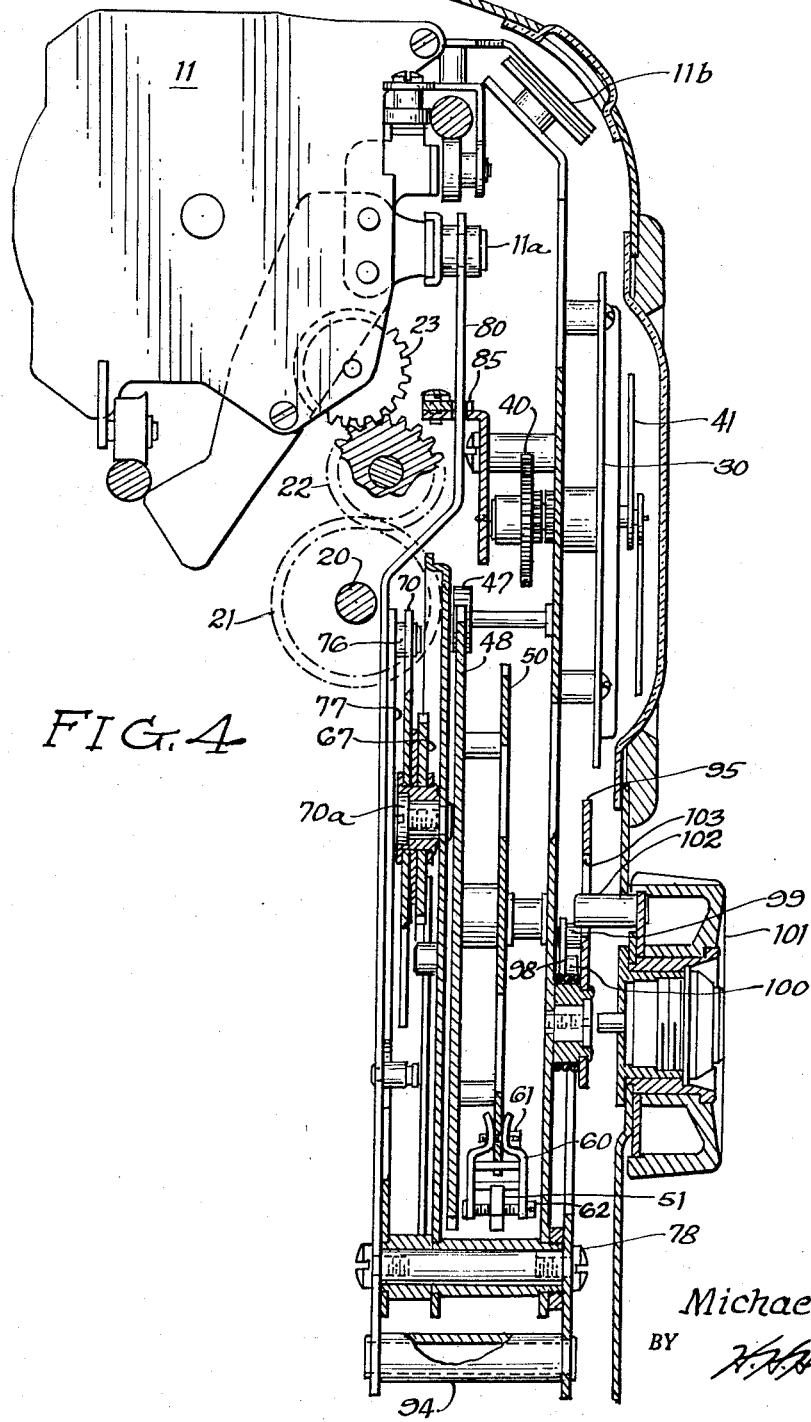
Fig. 4 is a vertical section taken along the line 4—4 in Fig. 1.

The device described above is capable of shifting a type unit from one position to the next at predetermined times throughout the day and performs this shifting function automatically without any care or attention. Novel means are, however, provided for enabling the type unit to be moved to any desired column on the card, regardless of the position to which the type unit may be currently set and with a high degree of accuracy. In order that this aspect of the invention may be readily understood reference is made to Figs. 1, 4 and 8. The shifting arm 80 is provided with a pair of cam followers 91, 92 which are widely spaced from one another on a V-shaped support 93. The cam follower support 93 is coupled to the lower end of the shifting arm 80 by means of a bar or cross-piece 94, so that the two members are rigidly tied together. Centered within the cam followers 91, 92 and straddled thereby is a double-faced operating cam 95 having a first serrated cam surface 96 which cooperates with cam follower 91 and a second serrated cam surface 97 which cooperates with the cam follower 92. The operating cam 95 normally occupies the center position shown in Fig. 1, being held in such position by a centering spring 98, the ends of which extend radially outward to embrace a post 99 on the cam 95 and a stationary or reference post 100 suitably mounted on the frame of the recorder. It will be apparent that any tendency toward rocking movement of the cam in one direction or the other will be resisted by the spring 98.

For the purpose of moving the cam 95 into engagement with one or the other of the cam followers a knob 101 is provided, having a rearwardly extending eccentric post 102 engaging a slot 103 formed in the cam.

An example of the manner in which manual positioning arrangement may be used is shown more or less schematically in Fig. 8. In this figure the knob 101 has been rotated to the left with corresponding rocking movement of the cam 95, bringing the cam surface 96 into engagement with the cam follower 91. It will be assumed in reference to Fig. 8 that the automatically set position of the printing unit 11 is shown in the dotted outline, the pointer 11b being directed to the last "out" column. When the manual knob 101 is turned to the left the shift arm 80 and type unit 11 move away from the arm 77, since the latter is blocked by the star wheel 68. Such separating movement is resisted by the spring 81 which interconnects the arms 77, 80 and which normally biases the arm 80 against the stop 77a on the arm 77. In the example shown, the type unit 11 is moved to the position which corresponds to the second "in" column. With the shift arm 80 and the type unit 11 in the position shown in Fig. 8, operating the release mechanism (not shown) conventionally provided on the time recorders of the present type, causes the imprinting to take place in the third column on the card.

It is one of the features of the present device that the cam surface 96 on the cam consists of distinct identations at increasing radial distances from the pivot point of the cam so that as the cam is rotated the cam follower occupies a series of sharply detented positions corresponding to the various columns on the card. Such detenting is readily felt by the operator as the knob is rotated, and during the imprinting the knob is positively held in a position corresponding to the desired column indicated visually by the pointer 11b. After imprinting, the knob 101 is released and returns to its central position. It will be apparent to one skilled in the art that the cam 95 does not affect the normal operation of the shift arm over its range of movement, since the cam followers 91, 92 are spaced away from the cam 95 by an adequate clearance on each side. Thus, in order to bring the cam 95 into contact with the cam follower it is necessary for the operator to rotate the knob 101 through a certain amount of idle movement which "takes up" the clearance, and any further movement of the knob 101 then determines the column in which printing takes place.

While Fig. 8 is illustrative of the condition where it is desirous to move the shift arm to the left of the existing or automatic position, overpowering movement to the right may just as easily be brought about by rotating the knob 101 in the clockwise direction. Under such conditions the shift arm 80 and arm 77 remain parallel to one another and both are swung bodily to the right of the position illustrated in Fig. 1. During this rotation the stop pin 76 on the arm 77 moves away from the abutting surface 71 on the star wheel. Rotation of the knob is continued from one sharply detented position to the next until the pointer indicates the desired column.

I claim as my invention:

1. In a workmen's in-and-out time recorder, the combination comprising a card receiver for a time card, means including a printing unit for imprinting time data on said card, means including a pivoted shift arm for providing relative shifting movement laterally between said printing unit and said card, a star wheel having a plurality of arms providing generally radial positioning surfaces, a stop member on said shift arm and arranged in the path of movement of the positioning surfaces on the star wheel, biasing means on said shift arm for biasing the same toward said star wheel for positioning thereby, a ratchet mechanism for advancing the star wheel in finite increments for imprinting in accurately spaced column positions across the face of the card, and means including a program device for operating said ratchet mechanism at predetermined times, said star wheel having a radius which is substantially shorter than the radius of movement of the stop member so that the stop member periodically slips clear of the engaged arm on the star wheel for engagement with the succeeding arm to restore the shift arm to the beginning of its cycle of shifting movement.

2. In a workmen's in-and-out time recorder, the combination comprising a card receiver for a time card, means including a printing unit for imprinting time data on said card, means including a pivoted shift arm for providing relative shifting movement between said printing unit and said card, means including a ratchet mechanism for shifting said shift arm through a series of angular positions corresponding to a plurality of columns on said time card, a program device for operating said ratchet mechanism at predetermined times, a manually rotatable cam member, said shift arm having a cam follower positioned in the path of movement of said cam member, spring return means for normally positioning the cam member in a retracted position relative to the follower to permit free movement of the shift arm under the normal control of the program device, said rotatable cam member having a serrated cam surface providing a plurality of sharply detented positions for accurate manual location of said printing unit at a selected one of the columns on said card.

3. In a workmen's in-and-out time recorder, the combination comprising a card receiver for a time card, means including a printing unit for imprinting time data on said card, means including a pivoted shift arm for providing relative shifting movement between said printing unit and said card, means including a ratchet mechanism for shifting said shift arm through a series of angular positions corresponding to a plurality of columns on said time card, a program device for operating said ratchet mechanism at predetermined times, a manually rotatable cam member having oppositely directed cam surfaces, said shift arm having spaced cam followers straddling said cam members and positioned in the path of movement of said cam surfaces, spring return means for normally positioning the cam member in a centered position between the cam followers to permit free movement of the shift arm under the normal control of the program device, each of said cam surfaces being serrated to provide a plurality of sharply detented positions at progressively increased radii for accurate manual location of said printing unit at a selected one of the columns on said card.

4. In a workmen's in-and-out time recorder, the combination comprising a card receiver for a time card, means including a printing unit for imprinting time data on said card, means including a pivoted shift arm for providing relative shifting movement between said printing unit and said card, means for normally shifting said shift arm through a series of angular positions corresponding to a plurality of columns on said time card, a program device for operating said shifting means at predetermined times, a manually rotatable cam member, said shift arm having a cam follower positioned in the path of movement of said cam member, spring return means for normally positioning the cam member in a retracted position relative to the follower to permit free movement of the shift arm under the normal control of the program device, said shift arm having a breakway connection with the normal shifting means to permit independent manual positioning of the shift arm, and said manual cam member having a serrated cam surface providing a plurality of sharply detented positions for accurate manual location of said printing unit at a selected one of the columns on said card.

5. In a workmen's in-and-out time recorder, the combination comprising a card receiver for a time card, means including a printing unit for imprinting time data on said card, means including a pivoted shift arm for providing relative shifting movement between said printing unit and said card, means including a ratchet mechanism for shifting said shift arm through a series of angular positions corresponding to a plurality of columns on said time card, a program device for operating said ratchet mechanism at predetermined times, a manually rotatable cam member having oppositely directed cam surfaces, said shift arm having a pair of cam followers arranged in V formation opposite the respective cam surfaces and spaced therefrom, spring return means for normally positioning the cam member in a centered position between the cam followers to permit free movement of the shift arm under the control of the program device, said shift arm having a spring biased breakaway connection to enable manual movement by said cam member in either direction from that established by the program device, each of said cam surfaces being serrated to provide a plurality of sharply detented positions for accurate location of said printing unit at a selected one of the columns on said card.

6. In a workmen's in-and-out time recorder, the combination comprising a card receiver for a time card, means including a printing unit for imprinting time data on said card, means including a pivoted shift arm for providing relative shifting movement between said printing unit and said card for printing in successive horizontal positions on said card, a star wheel having a plurality of arms providing generally radial abutment surfaces, a stop on said shift arm arranged in the path of the abutment surfaces on a star wheel, biasing means on said shift arm for biasing the stop against one of the abutment surfaces on said star wheel, a ratchet wheel coupled to said star wheel, a pawl mechanism for advancing the ratchet wheel in finite increments for imprinting in accurately spaced positions across the face of the card, means including a program device for operating said pawl mechanism at predetermined times, said ratchet wheel having a number of teeth per arm of the star wheel corresponding to the number of columns desired on said card, and said star wheel and ratchet wheel being readily removable as a unit to permit replacement by a unit having a different number of ratchet teeth for each arm of the star wheel.

References Cited in the file of this patent

UNITED STATES PATENTS

| | | |
|---|---|---|
| 2,299,044 | Streckfuss | Oct. 13, 1942 |
| 2,389,345 | Dell et al. | Nov. 20, 1945 |
| 2,553,644 | Fehr | May 22, 1951 |